(12) United States Patent
Juni

(10) Patent No.: US 7,477,816 B2
(45) Date of Patent: Jan. 13, 2009

(54) LENS-EQUIPPED OPTICAL WAVE GUIDE DEVICE FOR TOUCH PANEL AND OPTICAL WAVEGUIDE FOR USE IN THE SAME

(75) Inventor: Noriyuki Juni, Ibaraki (JP)

(73) Assignee: Nitto Denko Corporation, Osaka (JP)

(*) Notice: Subject to any disclaimer, the term of this patent is extended or adjusted under 35 U.S.C. 154(b) by 0 days.

(21) Appl. No.: 12/118,267

(22) Filed: May 9, 2008

(65) Prior Publication Data

US 2008/0279501 A1 Nov. 13, 2008

Related U.S. Application Data

(60) Provisional application No. 60/951,026, filed on Jul. 20, 2007.

(30) Foreign Application Priority Data

May 10, 2007 (JP) .............................. 2007-125973

(51) Int. Cl.
 G02B 6/32 (2006.01)
 G02B 6/26 (2006.01)
 G02B 6/42 (2006.01)
 G06F 3/042 (2006.01)
(52) U.S. Cl. .............................. 385/33; 385/31; 385/38; 385/39; 385/50; 385/52; 345/173; 345/175; 345/176
(58) Field of Classification Search ................... 385/33, 385/52; 345/176
See application file for complete search history.

(56) References Cited

U.S. PATENT DOCUMENTS 4,737,626 A * 4/1988 Hasegawa ................... 250/221

6,181,842 B1 * 1/2001 Francis et al. ................. 385/14
7,369,724 B2 * 5/2008 Deane .......................... 385/33

(Continued)

FOREIGN PATENT DOCUMENTS

WO WO 2006/059510 A1 6/2006

(Continued)

OTHER PUBLICATIONS

European Search Report dated Sep. 17, 2008 in corresponding European Application No. 08007846.2.

*Primary Examiner*—Frank G Font
*Assistant Examiner*—Ryan Lepisto
(74) *Attorney, Agent, or Firm*—Westerman, Hattori, Daniels & Adrian, LLP.

(57) ABSTRACT

A lens-equipped optical waveguide device for a touch panel includes an optical waveguide including an under cladding layer, and a plurality of cores formed on a surface of the under cladding layer with respective ends in parallel along one edge portion of the under cladding layer; and a lens device having amounting surface for placing the optical waveguide, and a lens formed in an end portion of the mounting surface. The one edge portion has an end surface which abuts the lens when the optical waveguide is placed on the lens device. The lens device is formed with a protrusion on its abutting surface for abutting the end surface, while the end surface is formed with a recess complementary to the protrusion so that the protrusion and the recess are meshed to cause the end surface and the abutting surface to be in intimate contact with each other.

4 Claims, 9 Drawing Sheets

U.S. PATENT DOCUMENTS

| | | |
|---|---|---|
| 2004/0201579 A1 | 10/2004 | Graham |
| 2005/0031291 A1 | 2/2005 | Gao et al. |
| 2005/0201681 A1* | 9/2005 | Payne .......................... 385/33 |
| 2005/0271326 A1* | 12/2005 | Luo ............................ 385/43 |
| 2006/0215963 A1 | 9/2006 | Hamano |
| 2007/0154133 A1* | 7/2007 | Graham ....................... 385/14 |
| 2007/0253717 A1* | 11/2007 | Charters et al. ............. 398/147 |
| 2008/0031584 A1* | 2/2008 | Payne ......................... 385/132 |
| 2008/0074402 A1 | 3/2008 | Cornish et al. |
| 2008/0074408 A1* | 3/2008 | Jang ........................... 345/206 |
| 2008/0111796 A1* | 5/2008 | Atkins et al. ................. 345/175 |
| 2008/0124024 A1 | 5/2008 | Shioda |
| 2008/0159694 A1* | 7/2008 | Payne .......................... 385/33 |
| 2008/0198144 A1* | 8/2008 | Shimizu et al. .............. 345/175 |

FOREIGN PATENT DOCUMENTS

| | | |
|---|---|---|
| WO | WO 2007/048180 A1 | 5/2007 |
| WO | WO 2008/034184 A1 | 3/2008 |

* cited by examiner

RELATED ART

LENS-EQUIPPED OPTICAL WAVE GUIDE DEVICE FOR TOUCH PANEL AND OPTICAL WAVEGUIDE FOR USE IN THE SAME

RELATED APPLICATIONS

This application claims the benefit of U.S. Provisional Application No. 60/951,026, filed on Jul. 20, 2007, which is hereby incorporated by reference.

BACKGROUND OF THE INVENTION

1. Field of the Invention

The present invention relates to a lens-equipped optical waveguide device for a touch panel and an optical waveguide for use in the same.

2. Description of the Related Art

Touch panels are input devices for operating an apparatus by directly touching a display screen of a liquid crystal display device or the like with a finger, a purpose-built stylus or the like, and include a display which displays operation details and the like, and a detection means which detects the position (coordinates) of a portion of the display screen of the display touched with the finger or the like. Information about the touch position detected by the detection means is sent in the form of a signal to the apparatus, which in turn performs an operation and the like displayed on the touch position. Examples of the apparatus employing such a touch panel include ATMs in banking facilities, ticket vending machines in stations, and portable game machines.

A detection means employing an optical waveguide is proposed as the detection means for detecting the finger touch position and the like on the touch panel (see, for example, US 2004/0201579 A1). Specifically, the touch panel includes optical waveguides provided around a periphery of a display screen of a rectangular display, and is configured to emit a multiplicity of light beams parallel to the display screen of the display from an optical waveguide provided on one side portion of the display screen toward the other side portion, and to receive the light beams with an optical waveguide provided on the other side portion. The optical waveguides cause the light beams to travel in a lattice on the display screen of the display. When a portion of the display screen of the display is touched with a finger in this state, the finger blocks some of the light beams. Therefore, the optical waveguide which receives the light beams senses a light blocked portion, whereby the position of the portion touched with the finger is detected.

The light beams emitted from an optical waveguide directly into the air diverge radially. In this state, light transmission efficiency is low. To enhance the light transmission efficiency, a lens-equipped optical waveguide device is proposed in which a lens is placed at the front of an optical waveguide which emits light beams to thereby prevent the light beams from diverging, and another lens is similarly placed at the front of an optical waveguide which receives the light beams to thereby cause the light beams in a converged state to enter the optical waveguide. This lens-equipped optical waveguide device is shown in FIGS. 10(a) and 10(b). In FIGS. 10(a) and 10(b), the lens-equipped optical waveguide device is adapted such that an optical waveguide 10 is placed on a lens device 20 having a mounting surface 21 for placing the optical waveguide 10 thereon, and a lens 22 formed to protrude from one edge portion of the mounting surface 21 so that light beams pass through the lens 22. The refraction of the lens 22 is used to prevent the divergence of emitted light beams and to converge incident light beams in a manner described above.

In the above-mentioned lens-equipped optical waveguide device, however, the light beams do not appropriately pass through the lens 22 and the light transmission efficiency is not sufficiently enhanced unless alignment between the optical waveguide 10 and the lens 22 is precisely performed. The alignment is troublesome and requires labor and time.

SUMMARY OF THE INVENTION

In view of the foregoing, it is therefore an object of the present invention to provide a lens-equipped optical waveguide device for a touch panel which facilitates alignment between an optical waveguide and a lens, and an optical waveguide for use in the same.

To accomplish the above-mentioned object, according to a first aspect of the present invention, there is provided a lens-equipped optical waveguide device for a touch panel comprising: an optical waveguide including an under cladding layer, and a plurality of cores formed on a surface of the under cladding layer with respective ends thereof arranged in parallel to each other along one edge portion of the under cladding layer; and a lens device having a mounting surface for placing the optical waveguide thereon, and a lens formed in an end portion of the mounting surface, the one edge portion of the under cladding layer along which the ends of the cores are formed having an end surface which abuts the lens of the lens device when the optical waveguide is placed on the mounting surface of the lens device, wherein the lens device is formed with a protrusion on an abutting surface thereof for abutting the end surface of the under cladding layer, while the end surface of the under cladding layer is formed with a recess complementary to the protrusion so that meshing engagement between the protrusion and the recess causes the end surface of the under cladding layer and the abutting surface of the lens device to be in intimate contact with each other.

According to a second aspect of the present invention, there is provided an optical waveguide for use in the foregoing lens-equipped optical waveguide device for a touch panel, the optical waveguide comprising: an under cladding layer, and a plurality of cores formed on a surface of the under cladding layer with respective ends thereof arranged in parallel to each other along one edge portion of the under cladding layer, wherein the one edge portion of the under cladding layer has an end surface formed with a recess which is complementary to the protrusion formed on the abutting surface of the lens device so that meshing engagement between the protrusion and the recess causes the end surface of the under cladding layer and the abutting surface of the lens device to be in intimate contact with each other.

In the lens-equipped optical waveguide device for the touch panel according to the present invention, the abutting surface of the lens of the lens device which abuts the end surface of the under cladding layer of the optical waveguide is formed with the protrusion, and the end surface of the under cladding layer is formed with the recess complementary to the protrusion. Thus, a simple process of meshing the protrusion and the recess allows the alignment between the optical waveguide and the lens, and brings the end surface of the under cladding layer and the abutting surface of the lens device into intimate contact with each other.

Where a plurality of protrusions and a plurality of recesses are formed, the accuracy of the alignment between the optical waveguide and the lens is improved.

Since the optical waveguide according to the present invention has the recess formed in the end surface of the one edge portion of the under cladding layer, the recess may be used to align a plurality of optical waveguides which are temporarily placed one upon another, whereby proper management of the optical waveguides is achieved.

DESCRIPTION OF THE PREFERRED EMBODIMENTS

A preferred embodiment according to the present invention will now be described in detail with reference to the drawings.

Figure 1:
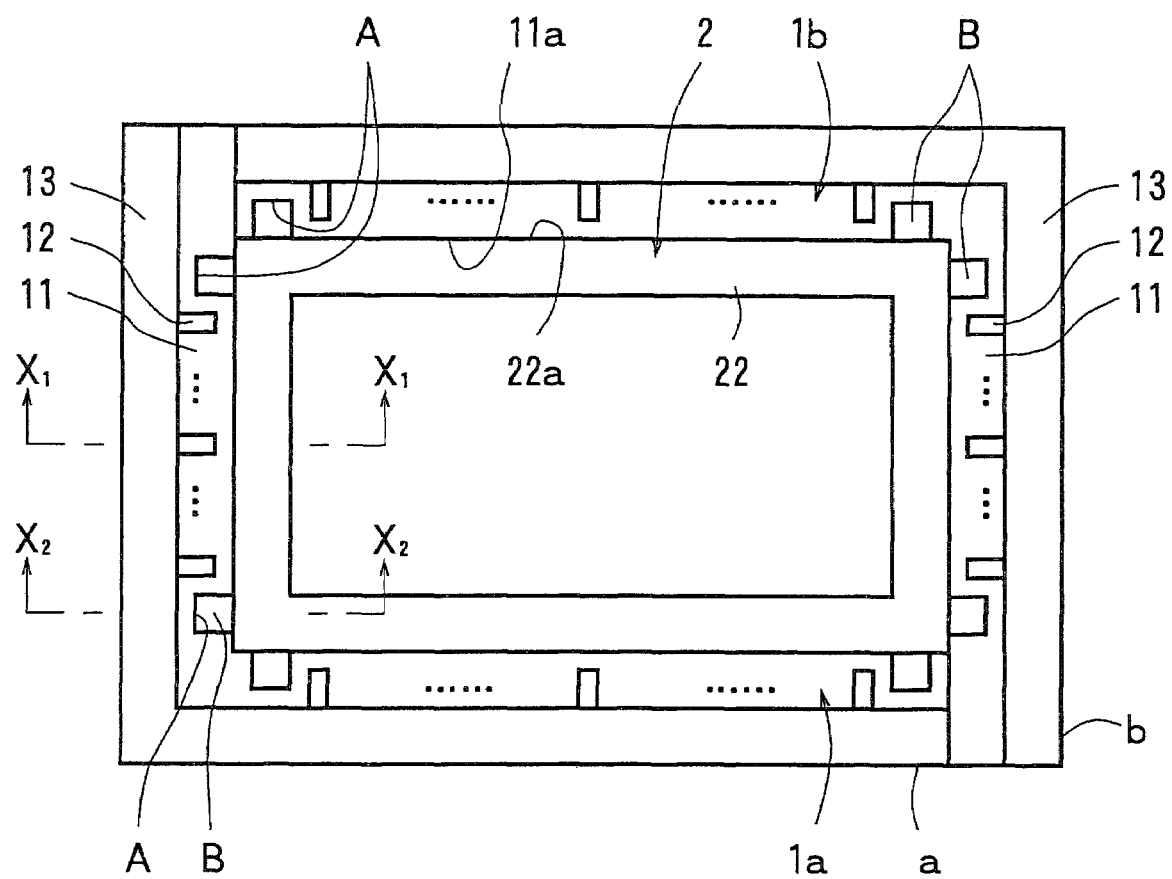
FIG. 1 is a plan view schematically illustrating one preferred embodiment of a lens-equipped optical waveguide device for a touch panel according to the present invention.

FIGS. 1, 2(a) and 2(b) illustrate a lens-equipped optical waveguide device for a touch panel according to one preferred embodiment of the present invention. The lens-equipped optical waveguide device for a touch panel according to this preferred embodiment includes a rectangular frame-shaped lens device 2, and two L-shaped optical waveguides 1a and 1b. The rectangular frame-shaped lens device 2 includes a portion having a curved lens surface of a lens 22 formed on an inner peripheral side thereof, and a mounting surface 21 formed on an outer peripheral side of the lens 22. The two L-shaped optical waveguides 1a and 1b are placed on the mounting surface 21 along the rectangular shape of the lens device 2. The lens 22 of the lens device 2 is formed with protrusions B on the outer peripheral side (see FIG. 3), and the optical waveguides 1a and 1b are each formed with recesses A on an inner peripheral side thereof (see FIG. 4). The meshing engagement between the protrusions B and the recesses A allows precise positioning of the optical waveguides 1a and 1b relative to the lens device 2 so that an end surface 11a of an under cladding layer 11 is in intimate contact with an outer peripheral surface (abutting surface) 22a of the lens 22. In FIGS. 1, 2(a) and 2(b), the reference numeral 12 designates cores, and the reference numeral 13 designates an over cladding layer.

Figure 2:
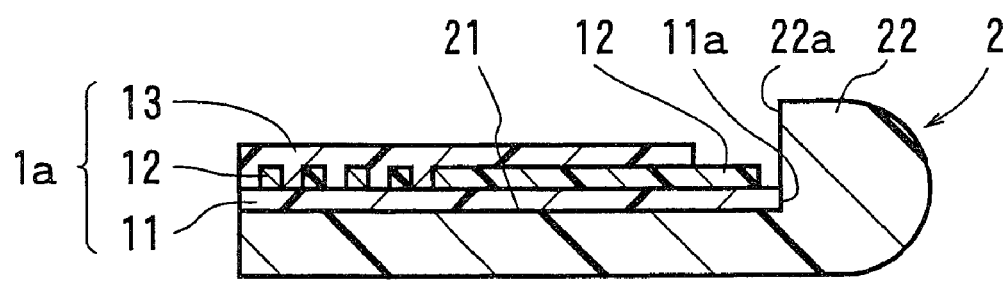
FIGS. 2(a) and 2(b) are sectional views taken along the line $X_1$-$X_1$ and the line $X_2$-$X_2$ of FIG. 1, respectively.
Figure 2:
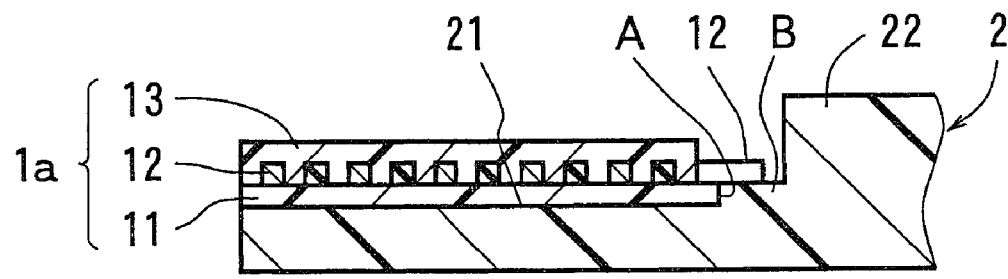
Figure 3:
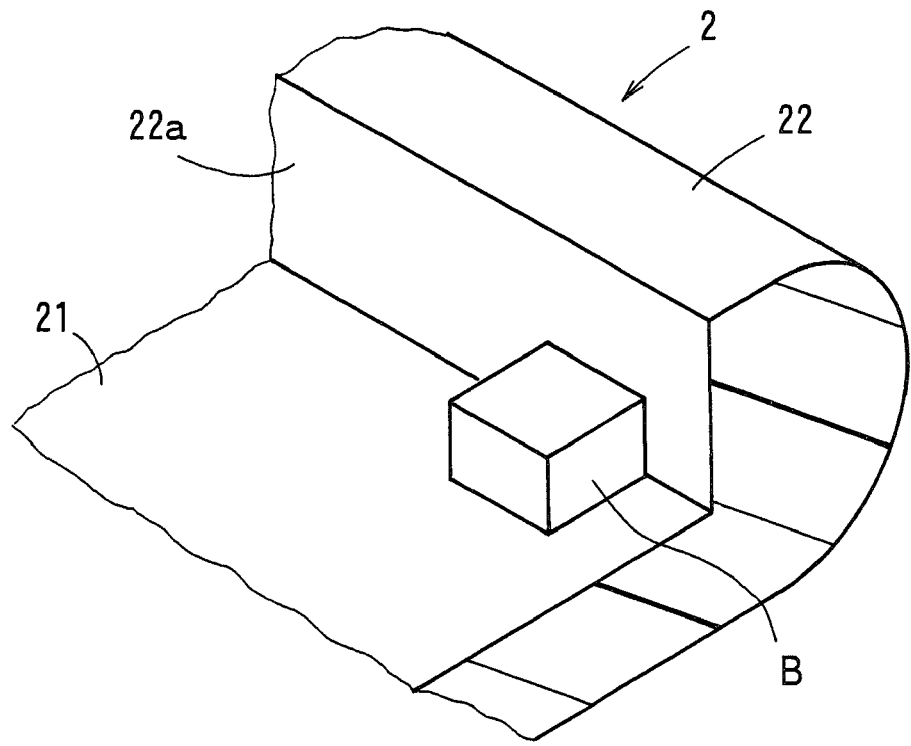
FIG. 3 is a perspective view on an enlarged scale schematically illustrating a major portion of a lens device constituting the lens-equipped optical waveguide device for the touch panel.
Figure 4:
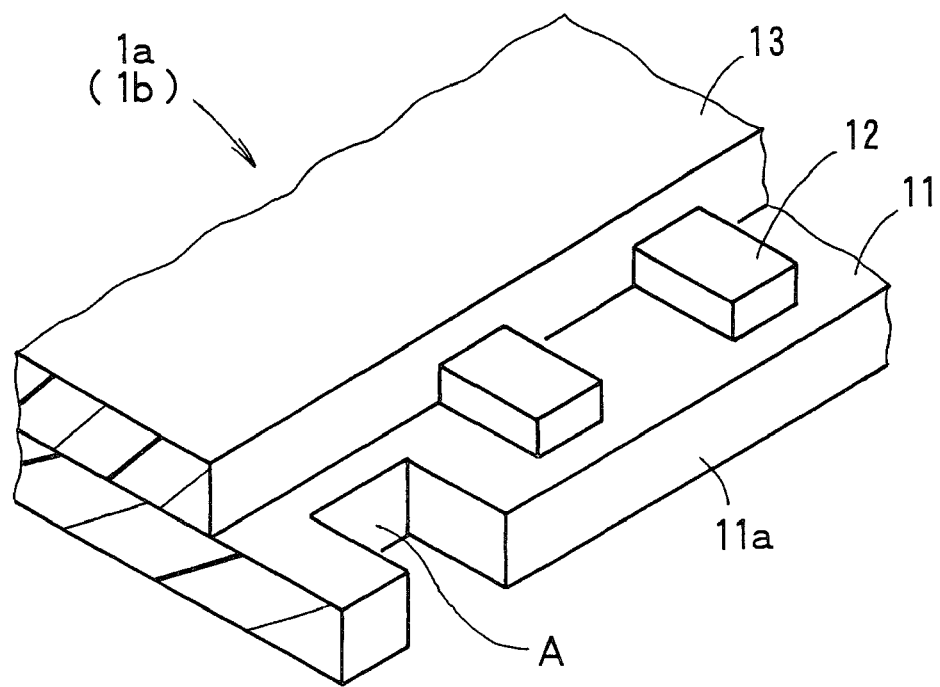
FIG. 4 is a perspective view on an enlarged scale schematically illustrating a major portion of an optical waveguide constituting the lens-equipped optical waveguide device for the touch panel.

More specifically, the lens device 2 has a rectangular frame-shaped configuration, as shown in FIGS. 1 to 3. The lens device 2 has the mounting surface 21 formed on the outer peripheral side of the frame-shaped configuration, and a portion formed with the curved lens surface to serve as the lens 22 on the inner peripheral side thereof. The lens 22 has a wall surface on the outer peripheral side thereof which is substantially perpendicular to the mounting surface 21 and serves as the abutting surface 22a abutting the end surface 11a (see FIG. 4) of the under cladding layer 11. The protrusions B each having a rectangular parallelepiped shape are formed integrally with the abutting surface 22a. In this preferred embodiment, the protrusions B are formed on both ends of each of the four sides of the rectangular shape of the frame-shaped lens 22, and are integrally formed also with the mounting surface 21.

In the L-shaped optical waveguide 1a,1b, a plurality of cores 12 are formed on the surface of the under cladding layer 11 and are arranged in a parallel, predetermined spaced relationship along the length of the under cladding layer 11, as shown in FIGS. 1, 2(a), 2(b) and 4. One ends of the cores 12 are disposed in parallel to each other along an inner edge portion of the surface of the under cladding layer 11, and each core extends along the L-shaped configuration of the under cladding layer 11 and terminates at end portion a, b (a lower right portion in FIG. 1) of the L-shaped configuration while being covered with the over cladding layer 13. It is the most distinctive feature of the present invention that the recesses A (see FIG. 4) for meshing engagement with the protrusions B (see FIG. 3) of the lens device 2 are formed in the end surface 11a of the inner edge portion of the under cladding layer 11, and the meshing engagement (fitting) between the protrusions B and the recesses A brings the end surface 11a of the under cladding layer 11 on the one edge side formed with the ends of the cores 12 and the abutting surface 22a (see FIG. 3) of the lens device 2 into intimate contact with each other. This allows simple and precise alignment. In FIGS. 1, 2(a) and 2(b), the number of cores 12 are shown as abbreviated.

Figure 5:
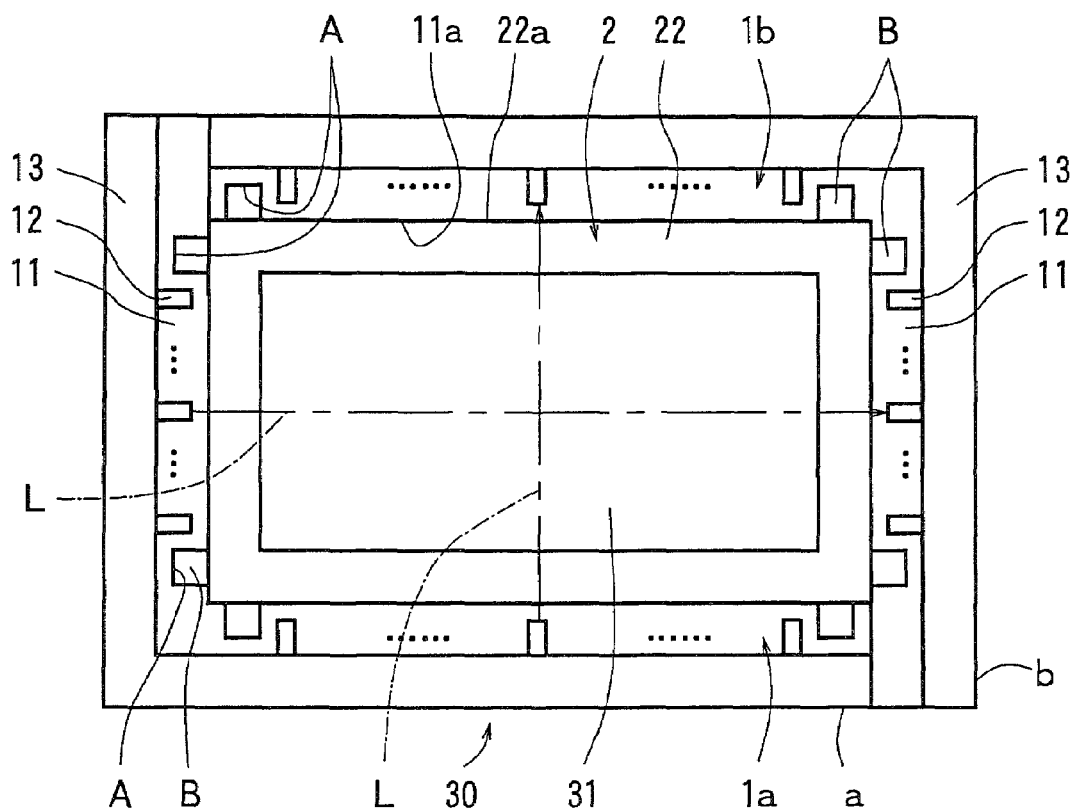
FIGS. 5(a) and 5(b) are a plan view and a sectional view, respectively, schematically illustrating a touch panel which employs the lens-equipped optical waveguide device for the touch panel.
Figure 5:
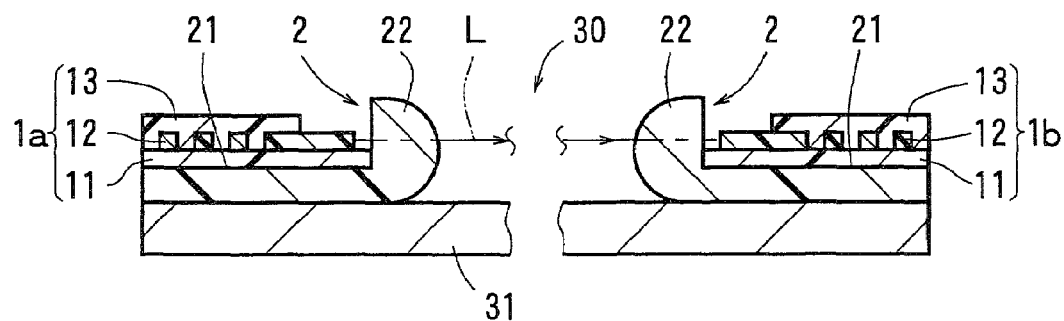

The lens-equipped optical waveguide device for a touch panel of a rectangular frame-shaped configuration which is formed by placing the optical waveguides 1a and 1b on the lens device 2 is provided around a periphery of a display screen of a rectangular display 31 of a touch panel 30, as shown in FIGS. 5(a) and 5(b). Any one of the two L-shaped optical waveguides serves as the optical waveguide 1a which emits light beams L, and a light source (not shown) is connected to the cores 12 in the one end portion a (the lower right portion in the figure) of the L-shaped configuration of the optical waveguide 1a. The other of the two optical waveguides serves as the optical waveguide 1b which receives the emitted light beams L, and a detector (not shown) is connected to the cores 12 in the one end portion b (the lower right portion in the figure) of the L-shaped configuration of the optical waveguide 1b.

In the lens-equipped optical waveguide device for a touch panel, the light beams L emitted from the ends of the cores 12 of the optical waveguide 1a are prevented from diverging by the refraction of the lens 22 of the lens device 2, and travels in that state along the display screen of the display 31. The incident light beams L, on the other hand, are changed into converged light beams L by the refraction of the lens 22 of the lens device 2, and the converged light beams L enter the cores 12 of the optical waveguide 1b.

The dimensions and the like of the lens-equipped optical waveguide device for the touch panel may be determined to conform to the size and the like of the display 31 of the touch panel 30, and are not particularly limited. For example, the dimensions of the frame-shaped lens device 2 are on the order of 40 mm to 500 mm (in length)×40 mm to 500 mm (in width); the thickness (height) of a portion of the lens device 2 corresponding to the mounting surface 21 is on the order of 0.1 mm to 5 mm; the width thereof is on the order of 1.5 mm to 80 mm; the thickness (height) of a portion of the lens device 2 corresponding to the lens 22 is on the order of 0.5 mm to 10 mm; the width thereof is on the order of 0.1 mm to 20 mm; and the protrusions B are on the order of 20 µm to 2 mm (in length)×20 µm to 2 mm (in width)×10 µm to 5 mm (in height). The dimensions of the L-shaped optical waveguide 1a,1b are as follows: the lengths of two elongated portions thereof perpendicular to each other are on the order of 40 mm to 500 mm, and the widths of the two elongated portions thereof are on the order of 1 mm to 40 mm. The length and width of the recesses A are identical with those of the above-mentioned protrusions B, and the height of the recesses A is identical with that of the under cladding layer 11 (5 µm to 50 µm). The number of light emitting (or light receiving) cores 12 may be determined according to the number of operation details to be displayed on the display screen of the display 31, and is not particularly limited. For example, on the order of 50 to 3000 cores 12 are provided on each side of the L-shaped configuration.

Next, an exemplary manufacturing method of the lens-equipped optical waveguide device for a touch panel according to the present invention will be described. In this manufacturing method, the optical waveguides 1a and 1b and the lens device 2 are produced separately and thereafter bonded together, which will be described in detail below.

Figure 6:
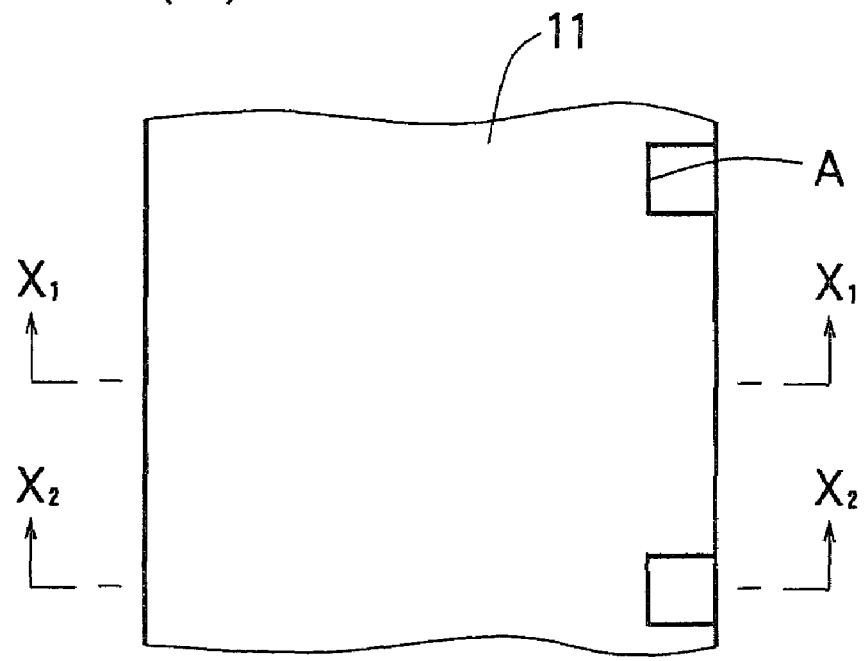
FIGS. 6(a), 6(b) and 6(c) are a plan view, a sectional view taken along the line $X_1$-$X_1$ of FIG. 6(a) and a sectional view taken along the line $X_2$-$X_2$ of FIG. 6(a), respectively, schematically illustrating a manufacturing method of the lens-equipped optical waveguide device for the touch panel.
Figure 6:
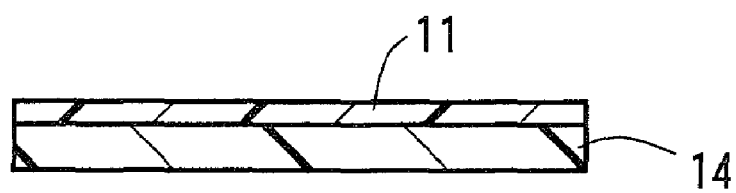
Figure 6:
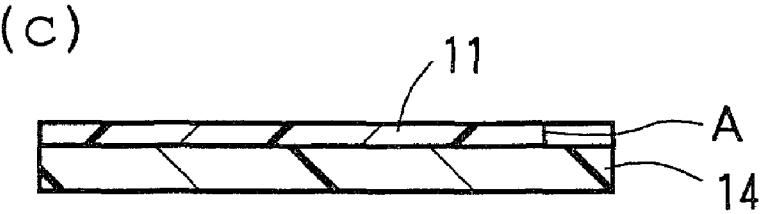

For the production of the optical waveguide 1a,1b, a base 14 having a flat shape is first prepared, as shown in FIGS. 6(a) to 6(c). A material for the formation of the base 14 is not particularly limited, but examples thereof include resins, glass, silicon and metals. Examples of the resins include polyethylene naphthalates, polypropylenes, polyethylenes, polyesters, polyacrylates, polycarbonates, polynorbornenes and polyimides. The thickness of the base 14 is not particularly limited. The thickness is typically set within a range of 20 µm (for a film-like base 14) to 5 mm (for a plate-like base 14).

Next, the under cladding layer 11 is formed on a predetermined region of a surface of the base 14. Examples of a material for the formation of the under cladding layer 11 include photosensitive resins, polyimide resins and epoxy resins. For the formation of the under cladding layer 11, a varnish prepared by dissolving the above-mentioned resin in a solvent is first applied onto the base 14. The application of the varnish is achieved, for example, by a spin coating method, a dipping method, a casting method, an injection method or an ink jet method. Next, the varnish is hardened. For this hardening, the material for the formation of the under cladding layer 11 is exposed to radiation through a photomask formed with an opening pattern corresponding to a desired shape of the under cladding layer 11 (a shape in which the recesses A are formed) where a photosensitive resin is used as the material for the formation of the under cladding layer 11. An exposed portion will later serve as the under cladding layer 11. Alternatively, where a polyimide resin is used as the material for the formation of the under cladding layer 11, the material for the formation of the under cladding layer 11 is generally hardened by a heat treatment at 300° C. to 400° C. for 60 to 180 minutes, and then portions corresponding to the recesses A are cut with a cutter or the like. The thickness of the under cladding layer 11 is generally in the range of 5 µm to 50 µm. In this manner, the under cladding layer 11 formed with the recesses A is produced.

Figure 7:
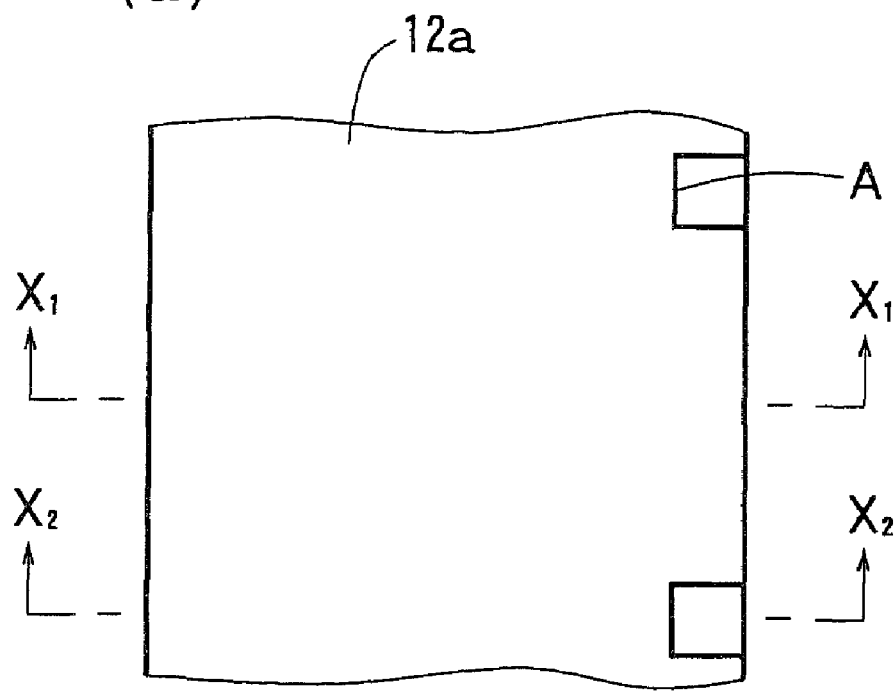
FIGS. 7(a), 7(b) and 7(c) are a plan view, a sectional view taken along the line $X_1$-$X_1$ of FIG. 7(a) and a sectional view taken along the line $X_2$-$X_2$ of FIG. 7(a), respectively, schematically illustrating the manufacturing method of the lens-equipped optical waveguide device for the touch panel.
Figure 7:
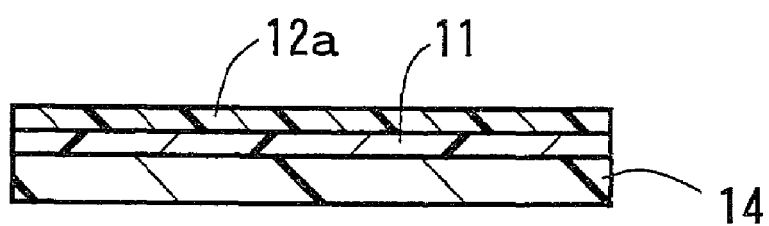
Figure 7:
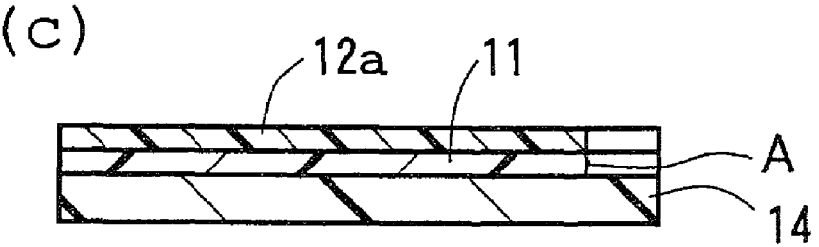

Next, as shown in FIGS. 7(a) to 7(c), a resin layer 12a which will later be formed into the cores 12 [see FIGS. 8(a) to 8(c)] by selective exposure is formed on a surface of the under cladding layer 11. An exemplary material for the formation of the resin layer 12a is a photosensitive resin. The material for the formation of the resin layer 12a used herein is a material having a refractive index greater than that of the materials for the formation of the under cladding layer 11 and the over cladding layer 13 [see FIGS. 9(a) to 9(c)] to be described later. The adjustment of this refractive index may be made, for example, by selecting the types of the materials for the formation of the under cladding layer 11, the cores 12 and the over cladding layer 13 and adjusting the composition ratio thereof. The method for the formation of the resin layer 12a is not particularly limited. The formation may be accomplished in the same manner as the under cladding layer 11 described above, for example, by applying a varnish prepared by dissolving the photosensitive resin in a solvent onto the under cladding layer 11, and then drying the varnish. The application of the varnish is achieved in the same manner as the under cladding layer 11 described above, for example, by a spin coating method, a dipping method, a casting method, an injection method or an ink jet method. The above-mentioned drying is achieved by a heat treatment at 50° C. to 120° C. for 10 to 30 minutes.

Figure 8:
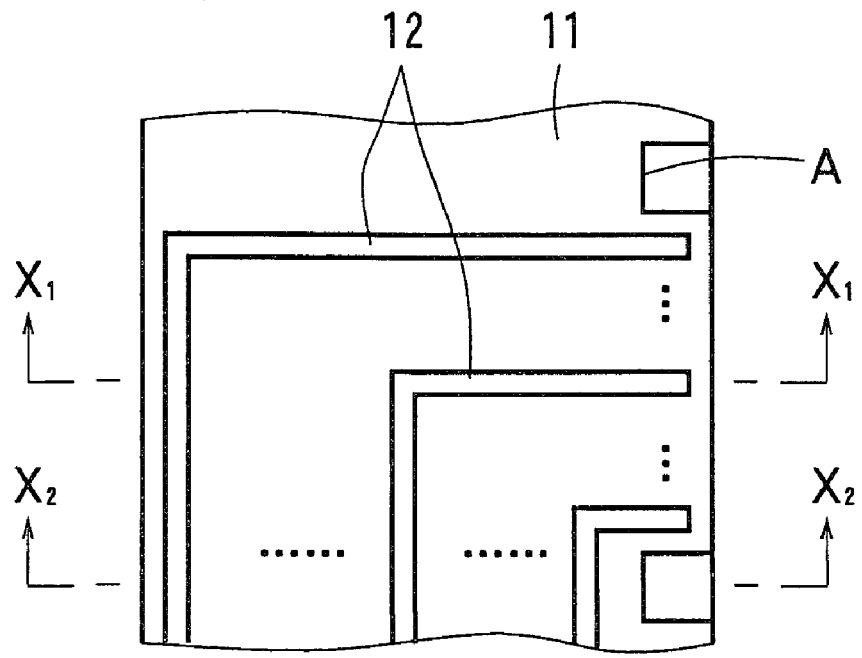
FIGS. 8(a), 8(b) and 8(c) are a plan view, a sectional view taken along the line $X_1$-$X_1$ of FIG. 8(a) and a sectional view taken along the line $X_2$-$X_2$ of FIG. 8(a), respectively, schematically illustrating the manufacturing method of the lens-equipped optical waveguide device for the touch panel.
Figure 8:
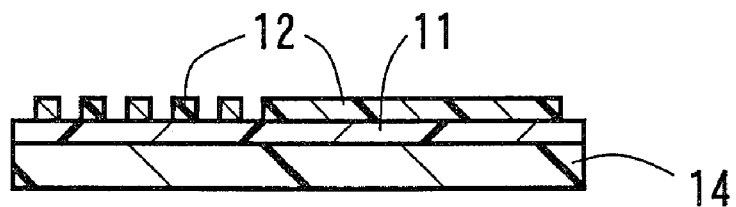
Figure 8:
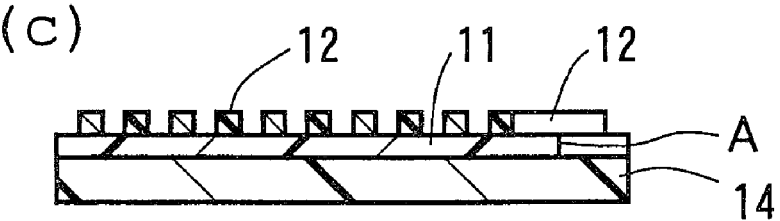

Then, the resin layer 12a is exposed to radiation through a photomask formed with an opening pattern corresponding to a desired pattern of the cores 12 [see FIGS. 8(a) to 8(c)]. Exposed portions will later serve as the cores 12. Examples of the radiation used for exposure used herein include visible light, ultraviolet radiation, infrared radiation, X-rays, alpha rays, beta rays and gamma rays. Preferably, ultraviolet radiation is used, since the use of ultraviolet radiation achieves irradiation with large energy to provide a high rate of hardening, and an irradiation apparatus therefore is small in size and inexpensive to achieve the reduction in production costs. A light source of the ultraviolet radiation may be, for example, a low-pressure mercury-vapor lamp, a high-pressure mercury-vapor lamp or an ultra-high-pressure mercury-vapor lamp. The dose of the ultraviolet radiation is generally 10 mJ/cm$^2$ to 10000 mJ/cm$^2$, preferably 50 mJ/cm$^2$ to 3000 mJ/cm$^2$.

After the exposure, a heat treatment is performed to complete a photoreaction. This heat treatment is performed at 80° C. to 250° C., preferably at 100° C. to 200° C., for 10 seconds to two hours, preferably for five minutes to one hour. Thereafter, development is performed using a developing solution to dissolve away an unexposed portion of the resin layer 12a, thereby patterning the resin layer 12a [see FIGS. 8(a) to 8(c)]. Then, the developing solution remaining after the development is removed by a heat treatment, whereby the pattern of the cores 12 is formed as shown in FIGS. 8(a) to 8(c). This heat treatment is typically performed at 80° C. to 120° C. for 10 to 30 minutes. In general, the thickness of each core 12 is in the range of 10 µm to 70 µm, and the width thereof is in the range of 5 μm to 30 μm. A tip of each core 12 is preferably formed in a lens-shaped configuration from the viewpoint of further improving optical transmission efficiency by preventing the divergence of light beams emitted from the tip of each core 12 and by converging light beams incident on the tip of each core 12. Exemplary methods to be employed for the development include an immersion method, a spray method and a puddle method. Examples of the developing solution used herein include an organic solvent and an organic solvent containing an alkaline aqueous solution. The developing solution and conditions for the development are selected as appropriate depending on the composition of a photosensitive resin composition.

Figure 9:
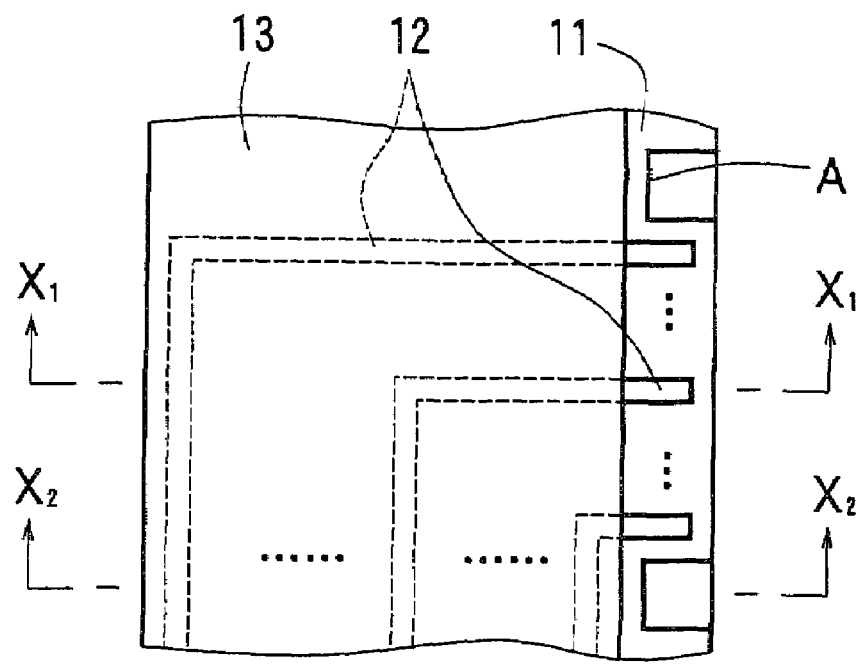
FIGS. 9(a), 9(b) and 9(c) are a plan view a sectional view taken along the line $X_1$-$X_1$ of FIG. 9(a) and a sectional view taken along the line $X_2$-$X_2$ of FIG. 9(a), respectively, schematically illustrating the manufacturing method of the lens-equipped optical waveguide device for the touch panel.
Figure 9:
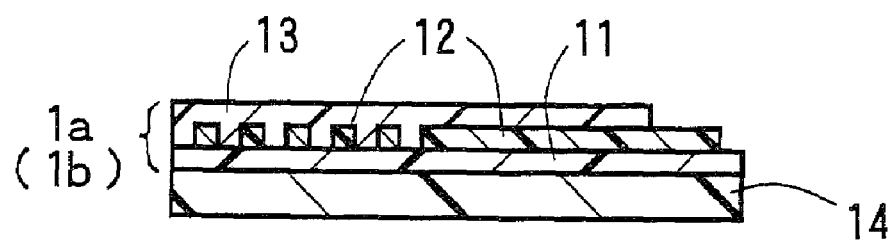
Figure 9:
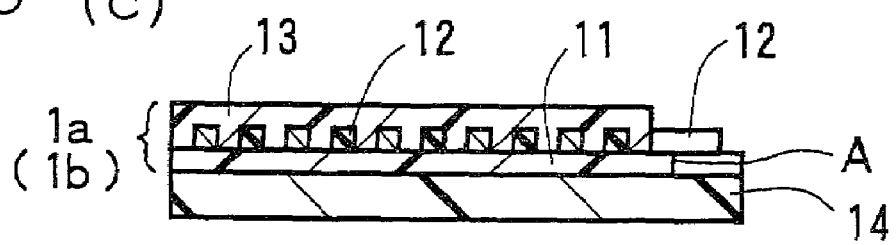
Figure 10:
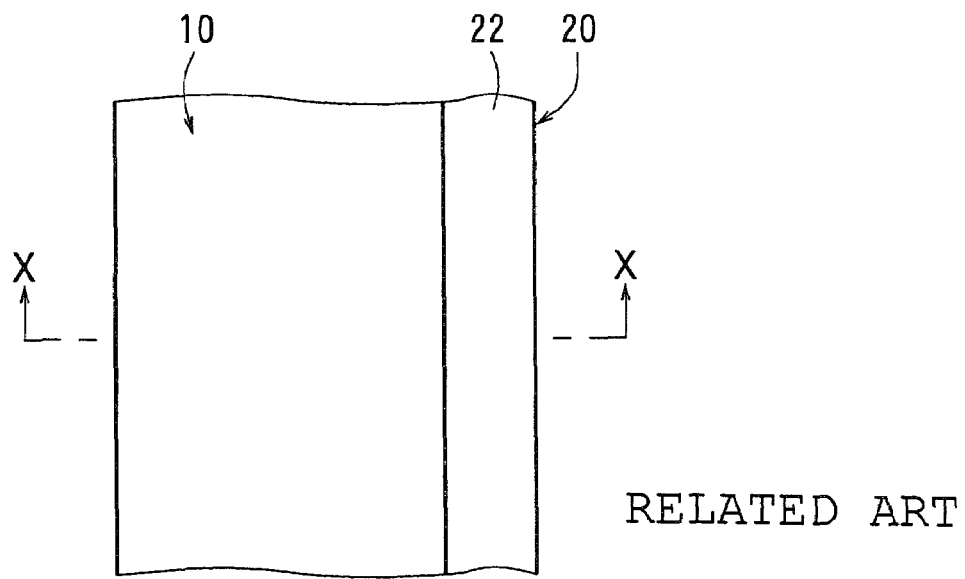
FIGS. 10(a) and 10(b) area plan view and a sectional view taken along the line X-X of FIG. 10(a), respectively, schematically illustrating a lens-equipped optical waveguide device for a touch panel of related art.
Figure 10:
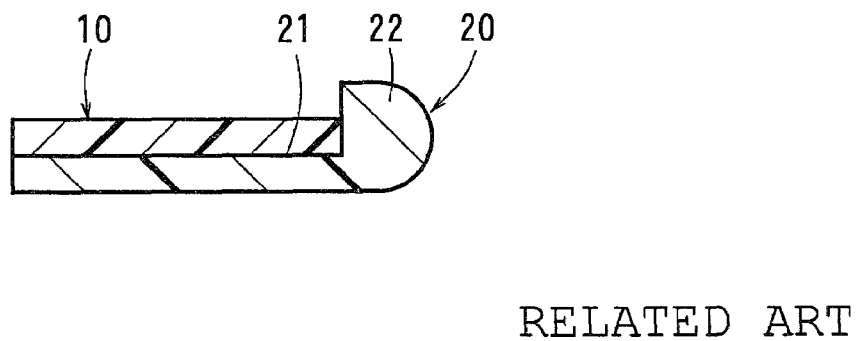

Next, as shown in FIGS. 9(a) to 9(c), the over cladding layer 13 is formed so as to cover the cores 12 except the ends thereof. Exemplary materials for the formation of the over cladding layer 13 are the same as those employed for the formation of the above-mentioned under cladding layer 11. The material for the formation of the over cladding layer 13 may be the same as or different from the material for the formation of the under cladding layer 11. The method for the formation of the over cladding layer 13 may be achieved in the same manner as the method for the formation of the above-mentioned under cladding layer 11. The thickness of the over cladding layer 13 is typically in the range of 20 μm to 100 μm.

Subsequently, the base 14 is removed from the under cladding layer 11. The base 14 and the under cladding layer 11 are bonded to each other with a smaller adhesive force because of their formation materials and, therefore, can be readily removed from each other by pulling the base 14 and the over cladding layer 13 by air suction. Thus, the optical waveguide 1a,1b is obtained.

The lens device 2 is produced by die-molding resin, in which the mounting surface 21, the lens 22 and the protrusions B are formed. Examples of the above-mentioned resin include polycarbonates, epoxy resins and acrylic resins.

Then, an adhesive is applied to the mounting surface 21 of the obtained lens device 2 (see FIG. 3). Thereafter, the meshing engagement is effected [see FIGS. 1, 2(a) and 2(b)] between the protrusions B of the lens device 2 and the recesses A of the optical waveguides 1a and 1b (see FIG. 4) to accomplish the precise positioning of the optical waveguides 1a and 1b relative to the lens device 2, and to bring the end surface 11a of the under cladding layer 11 into intimate contact with the outer peripheral surface (abutting surface) 22a of the lens device 2. In this state, the optical waveguides 1a and 1b are placed on the mounting surface 21 of the lens device 2, whereby the lens device 2 and the optical waveguides 1a and 1b are bonded to each other. Where an ultraviolet curable adhesive is used as the adhesive, the bonding is accomplished by irradiation with ultraviolet radiation through the optical waveguides 1a and 1b after the optical waveguides 1a and 1b are placed on the mounting surface 21. In this manner, the lens-equipped optical waveguide device for the touch panel according to the present invention [see FIGS. 1, 2(a) and 2(b)] is manufactured.

Thus, the lens-equipped optical waveguide device for the touch panel according to the present invention facilitates the precise alignment between the lens 22 of the lens device 2 and the optical waveguides 1a and 1b because the lens device 2 is formed with the protrusions B and the optical waveguides 1a and 1b to be placed on the lens device 2 are formed with the recesses A for meshing engagement with the protrusions B.

Further, the recesses A formed in the optical waveguides 1a,1b may also be used in alignment of a plurality of optical waveguides 1a,1b which are temporarily placed one upon another, thereby facilitating well-organized handling and storage of the optical waveguides 1a,1b.

In the above-mentioned preferred embodiment, only the under cladding layer 11 is formed with the recesses A because only the under cladding layer 11 is configured to be in abutment with the lens 22 of the lens device 22. However, where the optical waveguides are configured so that both the edge of the under cladding layer 11 and the edge of the over cladding layer 13 are to be in abutment with the lens 22 of the lens device 2, recesses A similar to the recesses A formed in the edge of the under cladding layer 11 maybe also formed in the edge of the over cladding layer 13, and protrusions B of the lens device 2 may be formed in a complementary manner.

In the above embodiment, although the lens device 2 are formed with two protrusions B on each side of the rectangular shape of the frame-shaped lens device 2, the number of protrusions B on each side of the rectangular shape is not limited to this, but may be one or at least three. Further, the shape of the protrusion B is not limited to the rectangular parallelepiped, but may be other shapes such as a semi-cylindrical shape. The shape of the recess A is also determined as appropriate in a complementary manner.

Further, although the over cladding layer 13 is formed in the preferred embodiment, the over cladding layer 13 is not essential and may not be present for the formation of the optical waveguide in some instances.

In the above-mentioned preferred embodiment, the configuration of the optical waveguides 1a,1b is a rectangular frame-shaped configuration formed by opposing the L-shaped optical waveguides 1a and 1b to each other, but is not limited to this configuration. Alternatively, the rectangular frame-shaped configuration may be formed by arranging four I-shaped optical waveguides 1a,1b, or by further integrating the four I-shaped optical waveguides 1a,1b. The frame-shaped configuration may be other configurations, for example, a polygonal configuration such as a hexagon or a circular configuration.

Next, an example of the invention will be described. It should be noted that the present invention is not limited to the inventive example.

EXAMPLE 1

Material for Formation of Under Cladding Layer and Over Cladding Layer

A material for formation of an under cladding layer and an over cladding layer was prepared by mixing 35 parts by weight of bisphenoxyethanolfluorene glycidyl ether (component A) represented by the following general formula (1), 40 parts by weight of 3',4'-Epoxycyclohexylmethyl-3,4-Epoxy-cyclohexane carboxylate which is an alicyclic epoxy (CELLOXIDE 2021P manufactured by Daicel Chemical Industries, Ltd.) (component B), 25 parts by weight of an alicyclic epoxy resin having a cyclohexene oxide skeleton (CELLOXIDE 2081 manufactured by Daicel Chemical Industries, Ltd.) (component C), and 2 parts by weight of a 50% propione carbonate solution of 4,4'-bis[di(β-hydroxyethoxy)phenyl-sulfinio]phenylsulfide bishexafluoroantimonate (component D).

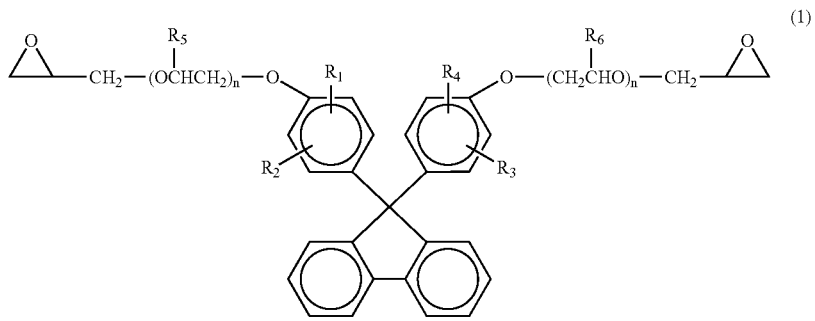

wherein R1 to R6 are hydrogen atoms, and n=1.

Material for Formation of Cores

A material for formation of cores was prepared by dissolving 70 parts by weight of the aforementioned component A, 30 parts by weight of 1,3,3-tris{4-[2-(3-oxetanyl)]butoxyphenyl}butane and one part by weight of the aforementioned component D in ethyl lactate.

Production of Optical Waveguide

The material for the formation of the above-mentioned under cladding layer was applied onto a surface of a polyethylene naphthalate base [160 mm×160 mm×188 μm (thickness)] by a spin coating method, and then exposed to ultraviolet radiation at 2000 mJ/cm$^2$ through a photomask formed with an opening pattern identical in shape (formed with two recesses) with the under cladding layer to be formed. Subsequently, a heat treatment was performed at 100° C. for 15 minutes to form the under cladding layer. The thickness of this under cladding layer was 30 μm when measured with a contact-type film thickness meter. The dimensions of each of the formed recesses were 0.3 mm×0.3 mm. The refractive index of this under cladding layer at a wavelength of 830 nm was 1.542.

Next, the material for the formation of the cores was applied onto the surface of the under cladding layer by a spin coating method. Thereafter, a drying process was performed at 100° C. for 15 minutes. Next, a synthetic quartz chromium mask (photomask) formed with an opening pattern identical in shape with a core pattern to be formed was placed on the resulting core material. Then, exposure to ultraviolet radiation at 4000 mJ/cm$^2$ was performed by a contact exposure method from above the photomask. Thereafter, a heat treatment was performed at 120° C. for 15 minutes. Next, development was carried out using an aqueous solution of γ-butyrolactone to dissolve away an unexposed portion. Thereafter, a heat treatment was performed at 120° C. for 30 minutes to form the cores. The dimensions of each of thus formed core in cross section were 12 μm in width×24 μm in height when measured with an SEM. The refractive index of the cores at a wavelength of 830 nm was 1.602.

Next, the material for the formation of the over cladding layer was applied by spin coating method to cover the cores. Then, exposure to ultraviolet radiation at 2000 mJ/cm$^2$ was performed through a photomask formed with an opening pattern identical in shape with the over cladding layer to be formed. Subsequently, a heat treatment was performed at 150° C. for 60 minutes, whereby the over cladding layer was formed. The thickness of the over cladding layer (a thickness as measured from the surface of the under cladding layer) was 40 μm when measured with a contact-type film thickness meter. The refractive index of the over cladding layer at a wavelength of 830 nm was 1.542.

Then, the polyethylene naphthalate base was removed from the under cladding layer. Thus, an optical waveguide including the under cladding layer, the cores and the over cladding layer, in which the recesses were formed in the edge of the under cladding layer, was obtained.

Production of Lens Device

A lens device formed with a mounting surface, a lens and two protrusions was produced by die-molding an epoxy resin as a material. The dimensions of each protrusion were 0.3 mm×0.3 mm×100 μm (in height).

Production of Lens-Equipped Optical Waveguide Device for Touch Panel

An ultraviolet cure adhesive was applied onto the mounting surface of the lens device. Thereafter, the meshing engagement is effected between the protrusions of the lens device and the recesses of the optical waveguide to achieve the precise positioning of the optical waveguide relative to the lens device and to bring the end surface of the under cladding layer into intimate contact with the lens device. In this state, the optical waveguide is placed on the mounting surface of the lens device. Thereafter, the optical waveguide is bonded to the mounting surface of the lens device by irradiation with ultraviolet radiation through the optical waveguide. In this manner, a lens-equipped optical waveguide device for a touch panel was produced.

The lens of the lens device and the optical waveguide were precisely aligned without any difficulty in the production of the lens-equipped optical waveguide device for the touch panel.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. A lens-equipped optical waveguide device for a touch panel comprising a lens device and an optical waveguide mounted thereon:

said optical waveguide including an under cladding layer, and a plurality of cores formed on a surface of the under cladding layer with respective ends thereof arranged in parallel to each other along one edge portion of the under cladding layer; and said lens device having a mounting surface for placing the optical waveguide thereon, and a lens formed in an end portion of the mounting surface, said one edge portion of the under cladding layer along which the ends of the cores were formed having an end surface which abuts the lens of the lens device when the optical waveguide is placed on the mounting surface of the lens device, wherein said lens device is formed with a protrusion on an abutting surface thereof for abutting said end surface of the under cladding layer, while the end surface of the under cladding layer is formed with a recess complementary to the protrusion so that meshing engagement between the protrusion and the recess causes the end surface of the under cladding layer and the abutting surface of the lens device to be in intimate contact with each other.

2. The lens-equipped optical waveguide device for the touch panel according to claim 1, wherein said protrusion includes a plurality of protrusions, and said recess includes recesses of a corresponding number to the protrusions.

3. An optical waveguide for use in a lens-equipped optical waveguide device for a touch panel, said optical waveguide comprising: an under cladding layer; and a plurality of cores formed on a surface of the under cladding layer with respective ends thereof arranged in parallel to each other along one edge portion of the under cladding layer, said one edge portion of the under cladding layer having an end surface, said lens-equipped optical waveguide device for a touch panel comprising: said optical waveguide; and a lens device having a mounting surface for placing the optical waveguide thereon, and a lens formed in an end portion of the mounting surface, said end surface of the one edge portion of the under cladding layer abutting the lens of the lens device when the optical waveguide is placed on the mounting surface of the lens device, said lens device being formed with a protrusion on an abutting surface thereof for abutting the end surface of the under cladding layer, wherein said end surface of the under cladding layer is formed with a recess which complementary to the protrusion so that meshing engagement between the protrusion and the recess causes the end surface of the under cladding layer and the abutting surface of the lens device to be in intimate contact with each other.

4. The optical waveguide according to claim 3, wherein said protrusion includes a plurality of protrusions, and said recess includes recesses of a corresponding number to the protrusions.

* * * * *